United States Patent [19]

Gersbeck

[11] 4,177,725

[45] Dec. 11, 1979

[54] METHOD OF AND APPARATUS FOR RECTIFYING DISTORTION IN AN ENDLESS PRESSING BAND

[75] Inventor: Rolf Gersbeck, Ronnenberg, Fed. Rep. of Germany

[73] Assignee: Hermann Berstorff Maschinenbau GmbH, Hannover Kleefeld, Fed. Rep. of Germany

[21] Appl. No.: 948,493

[22] Filed: Oct. 4, 1978

[30] Foreign Application Priority Data

Oct. 6, 1977 [DE] Fed. Rep. of Germany ....... 2744919

[51] Int. Cl.$^2$ .......................... B29C 3/00; B29H 5/00; B30B 15/28; B30B 15/14
[52] U.S. Cl. ........................................ 100/38; 100/43; 100/93 RP; 100/153; 264/40.1; 264/40.5; 425/150; 425/162; 425/373
[58] Field of Search ....................... 425/150, 162, 373; 100/35, 38, 43, 47, 93 RP, 151–154; 264/40.1, 40.5

[56] References Cited

U.S. PATENT DOCUMENTS 3,524,219  8/1970  Gersbeck ........................... 425/150

*Primary Examiner*—W.E. Hoag
*Attorney, Agent, or Firm*—Donald D. Jeffery

[57] ABSTRACT

In apparatus having an endless pressing band, formed of a layer of rubber with a steel-wire fabric connected thereto, passing around a heating drum, two associated guide rollers and a hitch roller, the relative positions of advancement of the opposite ends of a transverse weft wire of the steel-wire fabric are sensed by photoelectric cell arrangements and, upon sensing of a lagging of one end behind the other, control means are activated to move the bearing at one end of the hitch roller towards or away from the heating drum while retaining the axes of the hitch roller and the heating drum in a common plane.

2 Claims, 3 Drawing Figures

Fig.2
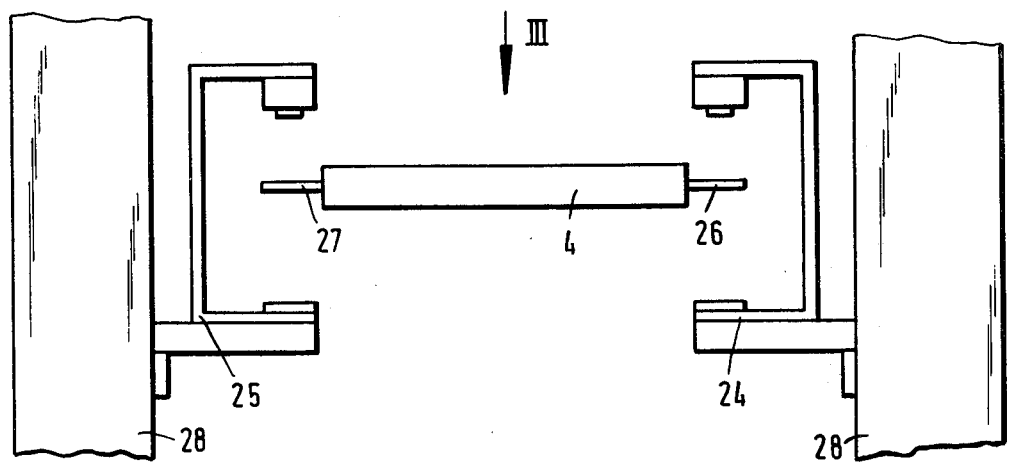
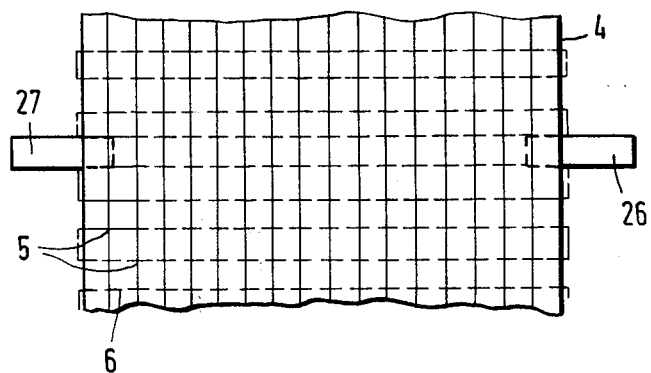
Fig.3

METHOD OF AND APPARATUS FOR RECTIFYING DISTORTION IN AN ENDLESS PRESSING BAND

The invention relates to a method of and apparatus for rectifying distortion in an endless pressing band, which pressing band comprises a layer of rubber with a steel-wire fabric connected thereto, the pressing band being wound around a heating drum, two associated guide rollers and a hitch roller.

It is known that in pressing bands of the kind mentioned above, distortions can occur over the whole fabric, whereby the weft wires in particular of the steel-wire fabric are subjected to excessive stress and hence tear. It has been proposed in U.S. Pat. No. 3,524,219 that the axis of the hitch roller should lie in a common plane with the axis of the heating drum. This proposal resulted from the findings that the main cause of distortion is lack of parallelism of the hitch roller axis in relation to the heating roller axis.

However even when the axis of the hitch roller is parallel to that of the heating roller, distortions can occur in the steel-wire fabric and can lead to premature destruction of the endless pressing band. Such distortions arise from the fact that the material to be pressed usually has a profile of slightly varying thickness over its width. If the material is thicker on one side, the steel-wire fabric is distorted. Similarly, the steel-wire fabric may be distorted if a layer of material is pressed which is of lesser thickness than the endless pressing band and which is fed into the pressing apparatus from one side.

According to one aspect of the invention, there is provided a method of rectifying distortion in an endless pressing band, which pressing band comprises a layer of rubber with a steel-wire fabric connected thereto, wound around a heating drum, two associated guide rollers and a hitch roller, wherein the relative positions of the opposite ends of at least one weft wire of the steel-wire fabric are monitored and, in the event of a deviation out of position of the two ends of that weft wire in relation to one another, the axis of the hitch roller is moved to adjust its inclination to the axis of the heating drum while retaining the axes of the hitch roller and the heating drum in a common plane.

If, from sensing the relative positions of advancement of the opposite ends of one of the weft wires, it is determined that one side of the pressing band is lagging behind the other, then one bearing of the hitch roller is displaced in said common plane. This can be effected by increasing or reducing the pressure which secures that bearing against the pull of the pressing band. The distorted pressing band is thus stretched back into its normal position until the opposite ends of each weft wire are at the same relative position of advancement one to the other.

According to another aspect of the invention, there is provided apparatus for rectifying distortion in an endless pressing band, which pressing band comprises a layer of rubber with a steel-wire fabric connected thereto, wherein the endless pressing band is guided around a heating drum, two associated guide rollers and a hitch roller, comprising markers at the opposite ends of at least one weft wire of the steel-wire fabric, photoelectric cell arrangements to sense the relative positions of the markers, a control device coupled to the photoelectric cell arrangements and adjusting means activated by the control device to adjust the inclination of the axis of the hitch roller to the axis of the heating drum while retaining the axes of the hitch roller and the heating drum in a common plane.

If there is a distortion in the endless pressing band, the end of the marked weft wire on the stretched side passes through the photoelectric cell arrangement somewhat prematurely. The time difference between the passage of the two lateral markers is transformed in the control device into a control signal which acts upon a bearing of the hitch roller. That bearing of the hitch roller is held in its modified position until the lateral markers of the weft wire are at the same relative position of advancement again. This indicates that the distortion in the endless pressing band has been rectified.

The invention is diagrammatically illustrated by way of example with reference to the accompanying drawings, wherein:

FIG. 2 illustrates a section to a larger scale taken on line II—II of FIG. 1; and FIG. 3 is a partial plan view of the endless pressing band of FIG. 1.

Figure 1:
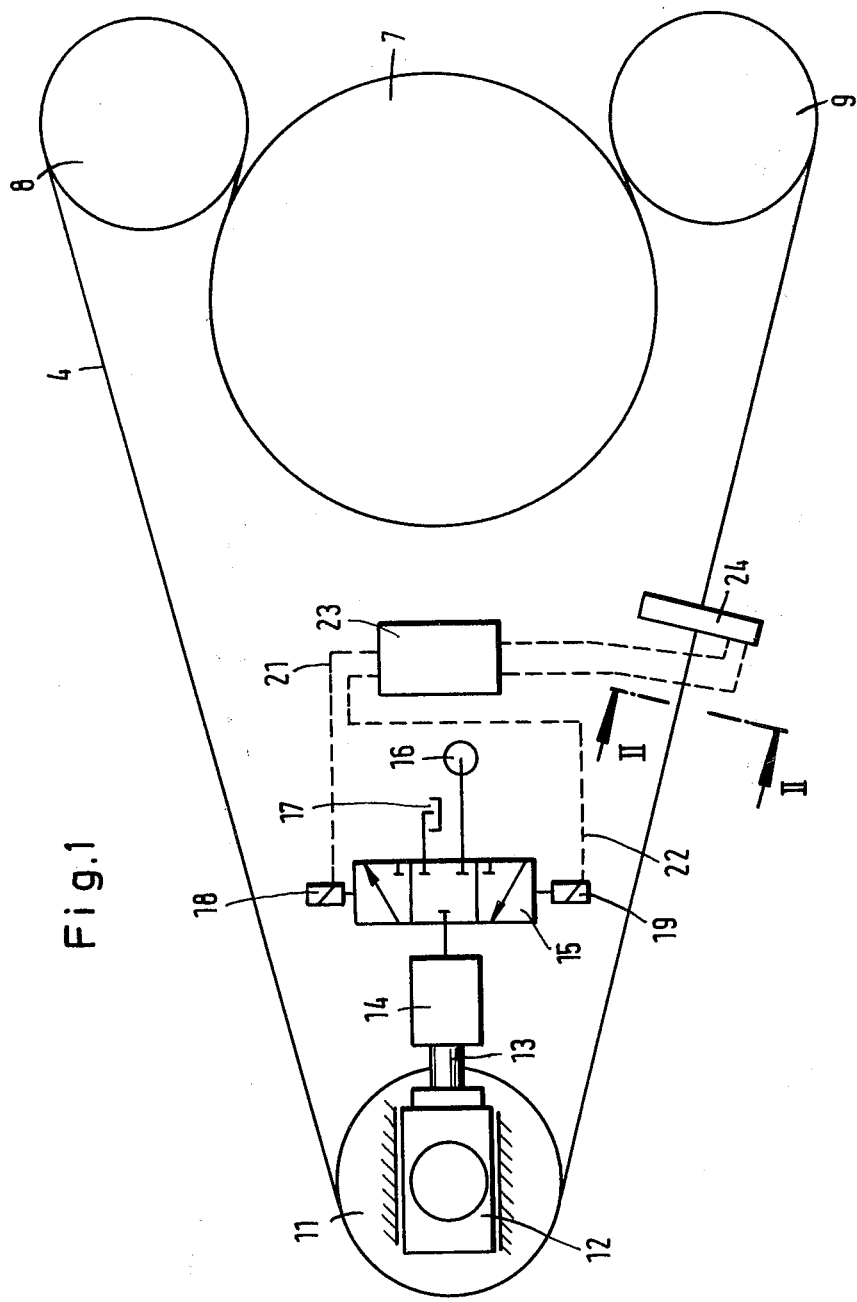
FIG. 1 is a schematic representation of continuous pressing apparatus with an endless pressing band incorporating apparatus according to and for carrying out the method of the invention.

Referring to the drawings, an endless pressing band 4 comprises a layer of rubber with a steel-wire fabric connected thereto and comprising longitudinally extending warp wires 5 and transversely extending weft wires 6. In the normal condition of the pressing band 4, the weft wires 6 extend perpendicular to the warp wires 5 (FIG. 3) and to the direction of movement of the belt in use. The pressing band 4 is wound around a rotatable heating drum 7, two associated guide rollers 8, 9 and a hitch roller 11. The hitch roller 11 is provided with bearings 12 (only one of which can be seen in FIG. 1) which are displaceably mounted in a machine stand. At least one of the displaceable bearings 12 is connected to a respective piston 13 of a pressure cylinder 14. The pressure cylinder 14 can be connected by way of a control valve 15 to a source 16 of pressure fluid or to an exhaust 17 or it can be locked in an intermediate position. The control valve 15 is actuated by electromagnets 18, 19, which are connected to an evaluation circuit 23 by electric leads 21 and 22. The evaluation circuit 23 receives scanning signals from two photoelectric cell arrangements 24 and 25 disposed adjacent opposite edges of the band 4.

In the embodiment illustrated, two adjacent weft wires 6 each have at their opposite ends a respective lateral marker 26 or 27, which markers 26 and 27 are suitable for interrupting a respective light beam of the photoelectric cell arrangements 24 and 25. The photoelectric cell arrangements 24 and 25 are mounted on the machine stand 28.

The method of operation of the arrangement described is as follows:

If the pressing band 4 becomes distorted during running, the lateral markers 27 and 27 will no longer be at the same position of advancement relative to one another due to the sloping position of the weft wires 6. In dependance on the direction of the distortion, one or the other lateral marker 26 or 27 will pass through its respective photoelectric cell arrangement 24 or 25 prior to the other passing through its respective photoelectric cell arrangement. The evaluation circuit 23 will therefore receive an electric signal which corresponds to the difference between the passage of the lateral markers 26 and 27. The evaluation circuit 23 converts the signal into a control signal for the control valve 15. In dependance on the direction of the distortion the pressure medium cylinder 14 is thus either connected to the pressure medium source 16 which exerts pressure on it or it is connected to the pressure medium exhaust 17. Thus the hitch roller 11 will be pivoted by way of the displaceable bearing 12 to move one end of the hitch roller 11 away from or towards the heating drum 7 to adjust the inclination of the hitch roller axis to the axis of the heating drum. The steel-wire fabric of the endless pressing band 4 will be stretched back into its normal position until the lateral markers 26 and 27 of the weft wires 6 are again at the same position of advancement relative to one another. This indicates that the distortion in the endless pressing band 4 has been rectified. The evaluation circuit 23 will then send a control signal to the control valve 15 to switch it over to the locked intermediate position.

If, in addition to the apparatus described above, there is a control apparatus of the kind known from U.S. Pat. No. 3,524,219, then after stretching the steel-wire fabric back into its normal position there is a switch-over to the control apparatus to obtain axis parallelism. This control apparatus is always deactivated when, in the face of axis parallelism, the lateral markers 26 and 27 of the pressing band 4 indicate a distortion in the steel-wire fabric.

In the apparatus illustrated in the drawings, per se known apparatus for the straight run of the pressing band has been omitted for reasons of clarity. This apparatus substantially comprises a coulisse disposed in the machine frame in which one bearing of the hitch roller is mounted for minimal lifting and lowering in a vertical direction.

What is claimed is:

1. A method of rectifying distortion in an endless pressing band, which said pressing comprises a layer of rubber with a steel-wire fabric connected thereto, wound around a heating drum, two associated guide rollers and a hitch roller, comprising the steps of monitoring the relative positions of the opposite ends of one weft wire of said steel-wire fabric and, in the event of a deviation out of position of the two ends of that said weft wire in relation to one another, moving the axis of said hitch roller to adjust its inclination to the axis of said heating drum while retaining the axes of said hitch roller and of said heating drum in a common plane.

2. Apparatus for rectifying distortion in an endless pressing band, which said pressing band comprises a layer of rubber with a steel-wire fabric connected thereto, wherein said endless pressing band is guided around a heating drum, two associated guide rollers and a hitch roller, comprising markers at the opposite ends of one weft wire of said steel-wire fabric, photoelectric cell arrangements to sense the relative positions of said markers, a control device coupled to said photoelectric cell arrangements and adjusting means activated by said control device to adjust the inclination of the axis of said hitch roller to the axis of said heating drum while retaining the axes of said hitch roller and said heating drum in a common plane.

* * * * *